UNITED STATES PATENT OFFICE.

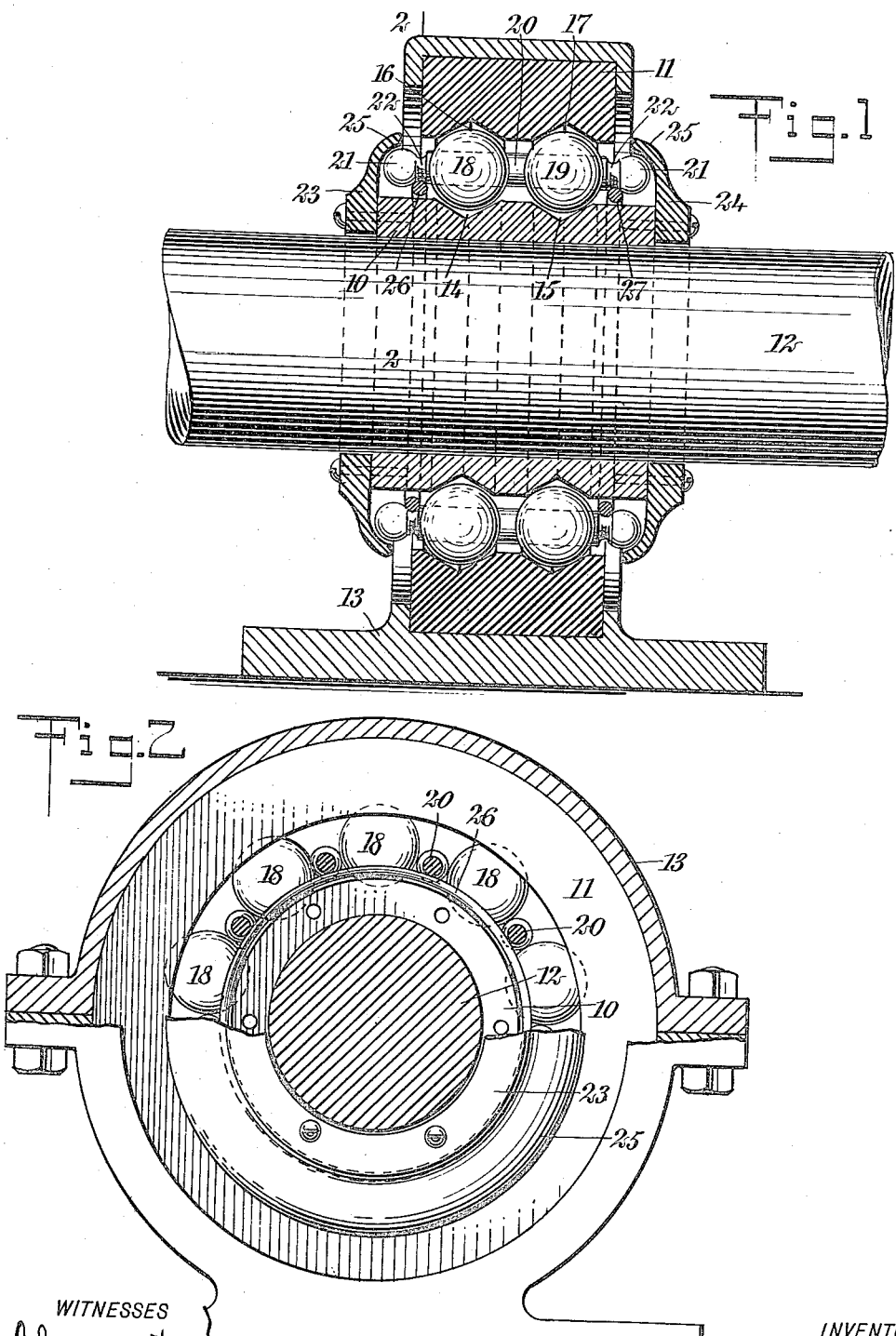

JOHN RAMSLIE, OF SAN MATEO, CALIFORNIA.

ROLLER-BEARING.

952,358.     Specification of Letters Patent.     Patented Mar. 15, 1910.

Application filed April 14, 1908. Serial No. 426,983.

*To all whom it may concern:*

Be it known that I, JOHN RAMSLIE, a subject of the King of Norway, and a resident of San Mateo, in the county of San Mateo and State of California, have invented a new and Improved Roller-Bearing, of which the following is a full, clear, and exact description.

This invention relates to certain improvements in roller bearings, and more particularly to that type of bearing in which there are provided two bearing members or race-rings separated by a plurality of rotatable load-supporting members, and in which said load-supporting members are spaced apart by intermediate rotatable spacing members.

The special object of the invention is to provide means whereby said rotatable spacing members will have rolling rather than sliding engagement with every part with which they connect.

A further object of the invention is to provide a bearing in which a plurality of rows of load-supporting balls are spaced and held uniform in respect to each other by a series of spacing rollers.

Reference is to be had to the accompanying drawings, forming a part of this specification, in which similar characters of reference indicate corresponding parts in both the figures, and in which—

Figure 1 is a longitudinal section through a bearing constructed in accordance with my invention; and Fig. 2 is an end view thereof, a portion being shown in section on the line 2—2 of Fig. 1.

In the specific form of my invention illustrated in the accompanying drawings, I provide two bearing members or race-rings 10 and 11, one of which is adapted to be secured to any suitable rotatable element, as, for instance, the shaft 12, and the other of which is adapted to be secured to any suitable stationary support, as, for instance, the base 13. In the outer surface of the bearing member or race-ring 10, I provide two annular grooves 14 and 15, and the inner surface of the outer bearing member or race-ring 11 is provided with two annular grooves 16 and 17 disposed in the same transverse plane as the two grooves 14 and 15. In the two pairs of opposed grooves I provide two annular rows of load-supporting balls 18 and 19, which permit of a free rotation of the bearing member 10 in respect to the bearing member 11. For spacing the balls apart and preventing two adjacent balls in the same row from coming into engagement, I provide a plurality of spacing rollers 20, each of a length somewhat greater than twice the diameter of the balls, plus the intervening space, so that a single row of spacing rollers serves for both annular rows of balls. The only parts which the balls engage with are the bearing members and the spacing rollers, and all of these parts have such relative movement in respect to each other that the balls engage with both the bearing members and also with the rollers by rolling rather than sliding contact. The special object of my invention is to hold the spacing rollers in their proper position, so that they will engage with the bearing members or other parts, by rolling rather than sliding engagement. To accomplish this object, I provide one of the bearing members with flanges extending beyond the ends of the rollers and curved laterally to engage with each roller at a point diametrically opposite from the bearing member carrying said flanges. The rollers are preferably provided with rounded heads 21, and intermediate each head and the body of the roller, I preferably provide a groove 22.

As illustrated, the inner bearing member 10 is provided with two annular plates 23 and 24 rigidly secured thereto, and each plate is provided with a flange 25 extending out around the adjacent roller ends and into engagement with the outer surface of the heads. To eliminate undue pressure of the spacing rollers against the load-supporting balls, I also provide two annular members or race-rings 26 and 27, disposed within the annular row of rollers and engaging within the grooves 22 adjacent the ends of said rollers. As all of the rollers rotate in the same direction and as the rings 26 and 27 engage solely with said rollers, said rings will be moved by their engagement with the rollers and there will be rolling rather than sliding contact. As the rollers are rotated in the reverse direction to the balls, their outer surfaces will be traveling in the same direction as is the outer surface of the bearing member 10, and, therefore, the outer surfaces will have rolling engagement with the inner surfaces of the flanges 25 carried by said inner bearing member 10. Thus, it will be noted that each and every member, element, or part of the structure, which has contact with any other member, element or part, and is movable in respect thereto, will have a rolling contact rather than a sliding contact, and, therefore, the friction will be reduced to the minimum and the least possible amount of energy will be wasted in transmission.

Having thus described my invention, I claim as new and desire to secure by Letters Patent:

1. In combination, two annular concentric bearing members, each having a plurality of grooves in the opposed faces, a plurality of rows of load-supporting balls interposed in said grooves, a plurality of spacing rollers, each extending across all of the rows of load-supporting balls and having ends of substantially spherical form and extending beyond said load-supporting balls, collars carried by one of said bearing members and terminating in flanges extending beyond the ends of the spacing rollers and having engagement with the spherical portions thereof upon their further side, and rings within the annular row of spacing rollers and having engagement solely therewith upon the sides thereof opposite to said flanges, said collars serving to resist endwise movement of said spacing members and also serving to prevent radial movement thereof in one direction.

2. In a ball-bearing, the combination of a plurality of annular rows of bearing balls, roller separators provided with reduced end portions, rings to engage the ends of said roller separators, and means to maintain said bearing balls and roller separators in operative relation.

In testimony whereof I have signed my name to this specification in the presence of two subscribing witnesses.

JOHN RAMSLIE.

Witnesses:
WILLIAM H. GRIMMELMAN,
C. A. RUTHERFORD.